United States Patent
Choi

(10) Patent No.: US 9,286,464 B2
(45) Date of Patent: Mar. 15, 2016

(54) DISPLAY APPARATUS USING KEY SIGNALS AND CONTROL METHOD THEREOF

(71) Applicant: SAMSUNG ELECTRONICS CO., LTD., Suwon-si (KR)

(72) Inventor: Sung-Il Choi, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/317,823

(22) Filed: Jun. 27, 2014

(65) Prior Publication Data

US 2015/0007309 A1  Jan. 1, 2015

(30) Foreign Application Priority Data

Jun. 27, 2013 (KR) .................. 10-2013-0074473

(51) Int. Cl.

| | | |
|---|---|---|
| *G06F 7/04* | (2006.01) | |
| *G06F 12/00* | (2006.01) | |
| *G06F 12/14* | (2006.01) | |
| *G06F 13/00* | (2006.01) | |
| *G06F 17/30* | (2006.01) | |
| *G11C 7/00* | (2006.01) | |
| *G06F 21/36* | (2013.01) | |

(52) U.S. Cl.
CPC ..................... *G06F 21/36* (2013.01)

(58) Field of Classification Search
CPC ......... G06F 21/36; G06F 21/32; G06F 21/31; G06F 3/0488; G06F 21/34
USPC ............................................................ 726/19
See application file for complete search history.

(56) References Cited

U.S. PATENT DOCUMENTS

| 6,144,401 A | 11/2000 | Casement et al. |
|---|---|---|
| 8,311,530 B2 | 11/2012 | Kornilovsky et al. |
| 2005/0262555 A1 | 11/2005 | Waterland |
| 2009/0319782 A1* | 12/2009 | Lee ................................ 713/156 |
| 2010/0043062 A1* | 2/2010 | Alexander et al. ................ 726/6 |

(Continued)

FOREIGN PATENT DOCUMENTS

| KR | 10-2003-0076866 A | 9/2003 |
|---|---|---|
| KR | 10-2006-0130351 A | 12/2006 |

(Continued)

OTHER PUBLICATIONS

Communication, dated Apr. 28, 2014, issued by the European Patent Office in counterpart European Patent Application No. 14153168.1.

*Primary Examiner* — Kambiz Zand
*Assistant Examiner* — Stephen Sanders
(74) *Attorney, Agent, or Firm* — Sughrue Mion, PLLC

(57) ABSTRACT

A display apparatus including an image processor which processes a video signal is provided. The display apparatus includes; a display which displays an image based on a processed video signal; a receiver which receives a key signal input by a user; a storage which stores a password key; and a controller which receives a user's first key signal which comprises an arrow key signal when a password is set up for the display apparatus, sets up and stores the password key which corresponds to the received first key signal, receives a user's second key signal when access is attempted, and allows the access in response to the received second key signal and the stored password key matching each other through a comparison.

18 Claims, 5 Drawing Sheets

(56) References Cited

U.S. PATENT DOCUMENTS

2010/0153735 A1 6/2010 Guenthner
2011/0076981 A1* 3/2011 Singh et al. ............ 455/404.1

FOREIGN PATENT DOCUMENTS

| WO | 00/48076 A1 | 8/2000 |
|---|---|---|
| WO | 2007/087352 A2 | 8/2007 |

* cited by examiner

DISPLAY APPARATUS USING KEY SIGNALS AND CONTROL METHOD THEREOF

CROSS-REFERENCE TO RELATED APPLICATION

This application claims priority from Korean Patent Application No. 10-2013-0074473, filed on Jun. 27, 2013 in the Korean Intellectual Property Office, the disclosure of which is incorporated herein by reference, in its entirety.

BACKGROUND

1. Field

Apparatuses and methods consistent with the exemplary embodiments relate to a display apparatus and a control method thereof. More particularly, the exemplary embodiments relate to a display apparatus and a control method thereof, in which a password key is set up and stored by a key signal which includes an arrow key signal, in order to set up a password, access is allowed if the key signals including the arrow key signals are matched with each other when they are compared.

2. Description of the Related Art

When a display apparatus, i.e., a Smartphone, a tablet computer, a notebook computer, or the like, is turned on; screen protection is stopped; a subscription channel is authenticated; and so on. A password is set up in order to prevent exposure of personal information and to maintain a function of restriction.

In general, a combination of letters and numerals is used to set up a password for a computer. In the case of a display apparatus, the password is set up through a remote controller. Through the remote controller, numerals are mostly input for setting up the password. However, if such a numerical password is easily determined; for example, if the numerical password generally contains numerals or a special date familiar to and shared with family members, etc., the password is likely to be exposed.

Accordingly, a function key has been used to set up the password and to allow access. However, the function key has no numeral key, and it is thus impossible to have access when the numerals of the password are combined with each other.

The arrow keys are provided for moving in a setting direction, and serve to move only to a selectable object on a screen.

Accordingly, it has been a requirement that the arrow key itself is set up as the password key so as to improve security capabilities.

SUMMARY

One or more exemplary embodiments may provide a display apparatus and a control method thereof, in which a password key is set up and stored by a key signal which includes an arrow key signal, in order to set up a password, and access is allowed in response to the key signals which include the arrow key signals being matched with each other when they are compared.

According to an aspect of another exemplary embodiment, a display apparatus may include an image processor configured to process a video signal; a display configured to display an image based on the processed video signal; a receiver configured to receive a key signal input by a user; a storage configured to store a password key; and a controller configured to receive a user's first key signal which comprises an arrow key signal in response to a password being set up for the display apparatus, sets up and stores the password key which corresponds to the received first key signal, receives a user's second key signal when access is attempted, and allows the access in response to the received second key signal and the stored password key being matched with each other through comparison.

The receiver may be configured to include a key operating portion operable in directions which respectively correspond to a plurality of arrow keys.

The receiver may be configured to receive, from a remote controller, a remote control signal which corresponds to the user's key signal.

The receiver may be configured to include a touch panel provided in the display and receive a user's touch input.

The display apparatus may further, include a user interface (UI) generator configured to which generate a UI to be displayed, the display may be configured to display the UI showing directions which correspond to the received key signal.

The controller may control a password checking UI which shows an input check and double check to be generated, which correspond to the key signal, in accordance with a touch of the arrow key on the UI.

According to an aspect of another exemplary embodiment, a method of controlling display apparatus may include receiving a user's first key signal which comprises an arrow key signal when a password is set up for the display apparatus; setting up and storing the password key which corresponds to the received first key signal; receiving a user's second key signal when access is attempted; comparing the received second key signal and the stored password key; and allowing the access in response to the received second key signal and the stored password key being matched with each other.

The receiving of the first key signal and the receiving of the second key signal may include receiving a remote control signal which corresponds to a user's key signal from a remote controller.

The receiving of the first key signal and the receiving of the second key signal may include receiving a touch input of a user.

The receiving of the first key signal and the receiving of the second key signal may include displaying a user interface (UI) which shows a direction corresponding to the received key signal.

The displaying of the UI may include generating a password checking UI which shows the input check and double check corresponding to the key signal, in accordance with touch of the arrow key on the UI.

An aspect of an exemplary embodiment may provide a display apparatus including: a receiver configured to receive a first or second key signal input by a user; and a controller configured to receive a user's first key signal which comprises an arrow key signal when a password is being set up for the display apparatus, set up and store the password key which corresponds to the received first key signal, receive a user's second key signal when access is attempted, and allows access in response to the received second key signal and a stored password key which match each other through a comparison.

The display apparatus may further include an image processor configured to process a video signal and a display configured to display an image based on the processed video signal.

The display apparatus may further include a storage configured to store the password key, wherein the controller controls a password checking UI which shows an input check and a double check to be generated which corresponds to the key signal, in accordance with touch of an arrow key on the password checking UI by the user.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Below, exemplary embodiments will be described in detail with reference to accompanying drawings. Exemplary embodiments may be achieved in various forms and are not limited to the examples set forth herein. For convenience of description, parts that are not directly related to the exemplary embodiments are omitted, and like numerals refer to the same or similar elements throughout.

Figure 1:
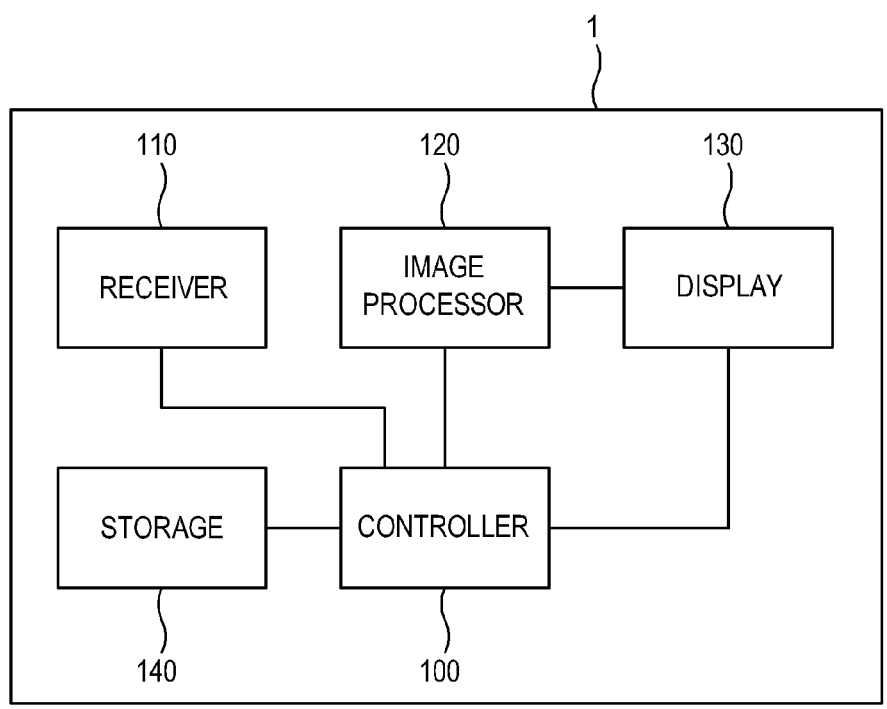
FIG. 1 is a block diagram showing elements of a display apparatus, according to an exemplary embodiment.

FIG. 1 is a block diagram showing elements of a display apparatus 1 according to an exemplary embodiment. As shown in FIG. 1, a display apparatus 1 according to an exemplary embodiment may include a receiver 110, an image processor 120, a display 130, a storage 140 and a controller 100.

The receiver 110 may transmit various preset control command or information to the controller 100 in accordance with operations and inputs from a user. The receiver 110 receives a key signal input by a user and transmits the received key signal to the controller 100. The receiver 110 may be implemented as a menu key or an input panel provided on the outside of the display apparatus 1, a remote controller separated from the display apparatus 1, etc. Alternatively, the receiver 110 and the display 130 may be formed as a single body. In response to the display 130 being a touch-screen, a user may touch an input menu (not shown) displayed on the display 130 so as to transmit a preset command to the controller 100.

The receiver 110 may receive a user's motion. A user's motion includes touch input. The receiver 110 may directly receive a user's motion, or may receive information from an external device which is related to the user's motion.

The kind of image processing performed by the image processor 120 is not limited, and may, for example, include decoding which corresponds to a format of image data; de-interlacing for converting interlaced image data into progressive image data; scaling for adjusting the image data to have a preset resolution; noise reduction, detail enhancement and frame refresh rate conversion, to improve picture quality; and so on.

The image processor 120 may be achieved by a system on chip (SOC) where various functions are integrated, or by an image processing board that individual elements for independently performing the respective processes are mounted to a printed circuit board, and internally provided in the display apparatus 1.

The image processor 120 may perform various imaging processes which were previously set up with regard to a broadcasting signal containing a video signal received from the receiver 110, and a source image containing a video signal received from a video source. The image processor 120 outputs such a processed video signal to the display 130 so that the processed source image can be displayed on display 130.

The display 130 may display an image based on the video signal output from the image processor 120. The display 130 may be implemented without limitation, and thus may be, for example, achieved by various display types such as liquid crystal, plasma, light-emitting diode, organic light-emitting diode, surface-conduction electron-emitter, carbon nano-tube, nano-crystal, etc.

The display 130 may further include additional elements in accordance with the type of display. For example, in response to the display 130 being of a liquid crystal type, the display 130 may include a liquid crystal display panel (not shown), a backlight (not shown) which emits light to the panel, and a panel driving substrate (not shown) for driving the panel (not shown).

The storage 140 has to save data even though the display apparatus 1 is turned off. The storage 140 may be a non-volatile memory (writable read only memory (ROM)) on which matters changed by a user are reflected. That is, the storage 140 may be provided as one among a flash memory, an erasable programmable read only memory (EPROM) or an electrically erasable and programmable read only memory (EEPROM). The storage 140 may store a password key set up by a user.

The controller 100 receives a user's first key signal which contains an arrow key signal when a password is set up for the display apparatus 1, sets up and stores a password key which corresponds to the received first key signal, receives a user's second key signal when access is attempted, and allows access when the second key signal and the stored password key are matched with each other through a comparison of the second key signal and the stored password key.

Figure 2:
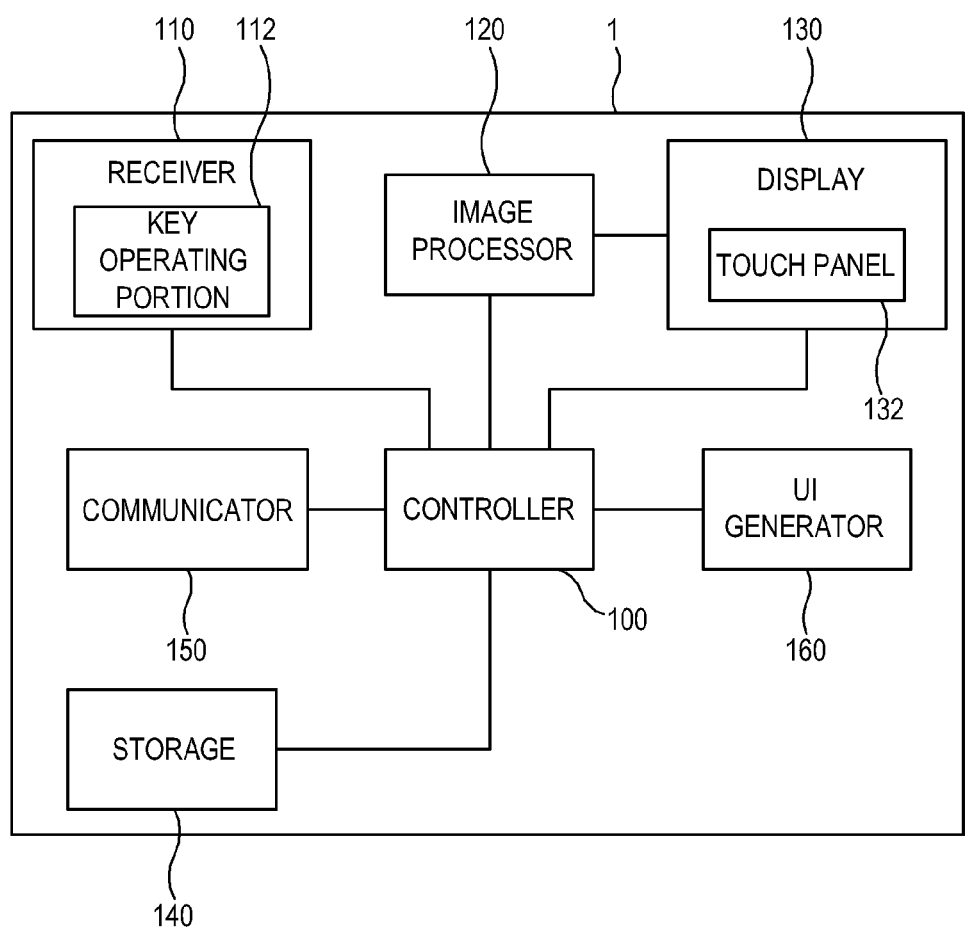
FIG. 2 is a block diagram showing elements of a display apparatus, according to an exemplary embodiment.

FIG. 2 is a block diagram showing elements of a display apparatus according to an exemplary embodiment. As shown in FIG. 2, the display apparatus 1 according to an exemplary embodiment includes a communicator 150 and a UI generator 160 in addition to the elements shown in FIG. 1.

The receiver 110 may include a key operating portion 112 operable in directions which respectively correspond to the plurality of arrow keys. For example, the receiver 110 may be achieved by a remote controller 2 (FIG. 4) having the key operating portion 112, or may be achieved by the key operating portion 112 being provided at one side of the display 130 and operable like the arrow keys of the remote controller 2. The display 130 may be provided as a touch panel 132 and may include the receiver 110, or may be provided as a user interface having the arrow keys and being operable with regard to the different arrow directions.

The receiver 110 may receive a remote control signal from the remote controller which corresponds to a user's key signal from the remote controller 2. In this case, the receiver 110 may provide controller 100 with the key signal, i.e., the arrow key signal of the remote controller 2.

The receiver 110 may include the touch panel 132 provided in the display 130 and may receive a user's touch input. The receiver 110 and the display 130 may be formed as a single body, in which, if the display 130 is a touch screen, a user may touch an input menu (not shown) displayed on the display 130, thereby transmitting a preset command to the controller 100.

The UI generator 160 may generate a user interface (UI) for operating an executed application program. The generated UI includes a plurality of sub UIs provided in the form of an icon, a text, etc. In response to a user selecting a certain sub UI through the display apparatus 1, an application program may be operated which corresponds to the selected sub UI. That is, each sub UI may be generated by a plurality of functions or event units operating the application program which runs on the display apparatus 1.

The UI generator 160 refers to a function of software or hardware for generating and controlling a UI displayed on the display 130, and its function can be performed by the controller 100, to be described later. In other words, the UI generator 160 may be achieved by a separate chipset, or may be not achieved by a separate microprocessor of a separate chipset. The UI generator 160 generates a UI showing a direction which corresponds to the key signal received in the receiver 110 so that the UI can be displayed on the display 130. The UI generator 160 may generate a password checking UI showing an input check and a double check which corresponds to the key signal in accordance with touches of the arrow keys on the UI, under the control of controller 100.

The controller 100 may perform general control of internal elements of the display apparatus 1. The controller 100 may control the UI generator 160 to generate the password checking UI which shows the input check and the double check which correspond to the key signal, in accordance with a user touch on the arrow keys of the UI.

Figure 3:
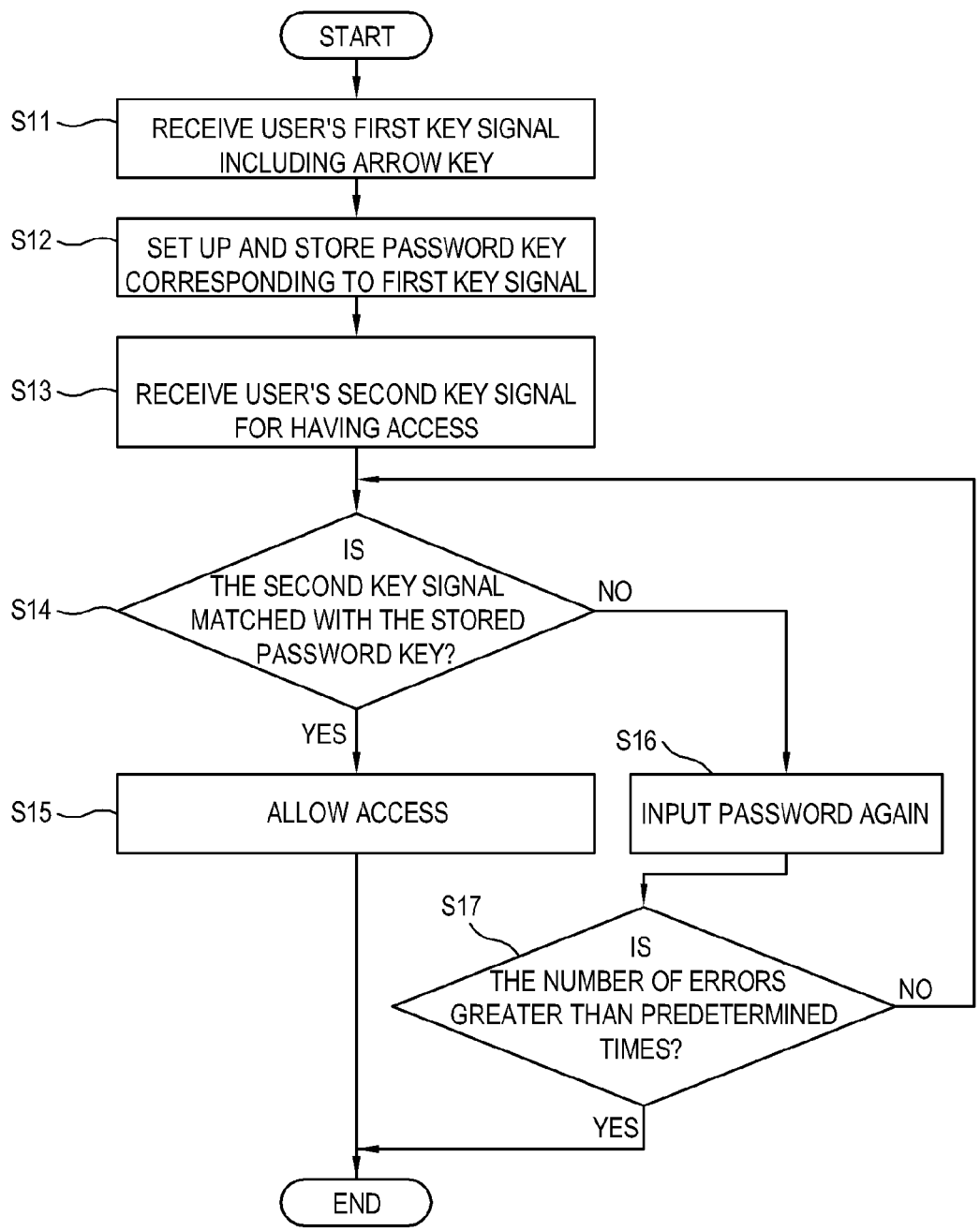
FIG. 3 is a control flowchart which shows operations of a display apparatus, according to an exemplary embodiment.

FIG. 3 is a control flowchart showing operations of a display apparatus according to an exemplary embodiment.

A user causes the display 130 to display an image for setting up a password of the display apparatus 1. Then, a user inputs the first key signal, including the arrow key signal, as a password through the remote controller 2, the touch panel 132 or the key operating portion 112. Thus, the receiver 110 of the display apparatus 1 receives the first key signal and transmits it to the controller 100 (S11). The controller 100 sets up the password key which corresponds to the first key signal, and stores the setup password key in the storage 140 (S12). After the password is completely set up, a user inputs the second key signal to attempt to obtain access, and the receiver 110 receives the second key signal (S13). The controller 100 compares the received second key signal with the password key stored in the storage 140 and determines whether they match each other (S14). In response to the received second key signal matching the password key stored in the storage 140, access is allowed (S15). On the other hand, in response to the received second key signal not matching the password key stored in the storage 140, a UI for inputting a password again may be displayed. Then, a user inputs a password again (S16), the receiver 110 receives the input password, and the controller 100 checks the number of errors in inputting the password, and determines whether the number of errors is greater than a predetermined number of times, for example, greater than three times or five times (S17). In response to the number of errors in inputting the password being greater than a permitted predetermined number of times, the UI for inputting the password may be terminated. In this case, a previously watched channel screen or a previous operation screen may be displayed, or the control procedure of the display apparatus 1 may be ended. In response to a termination of the UI having access, the UI for setting up the password may again be displayed.

Figure 4:
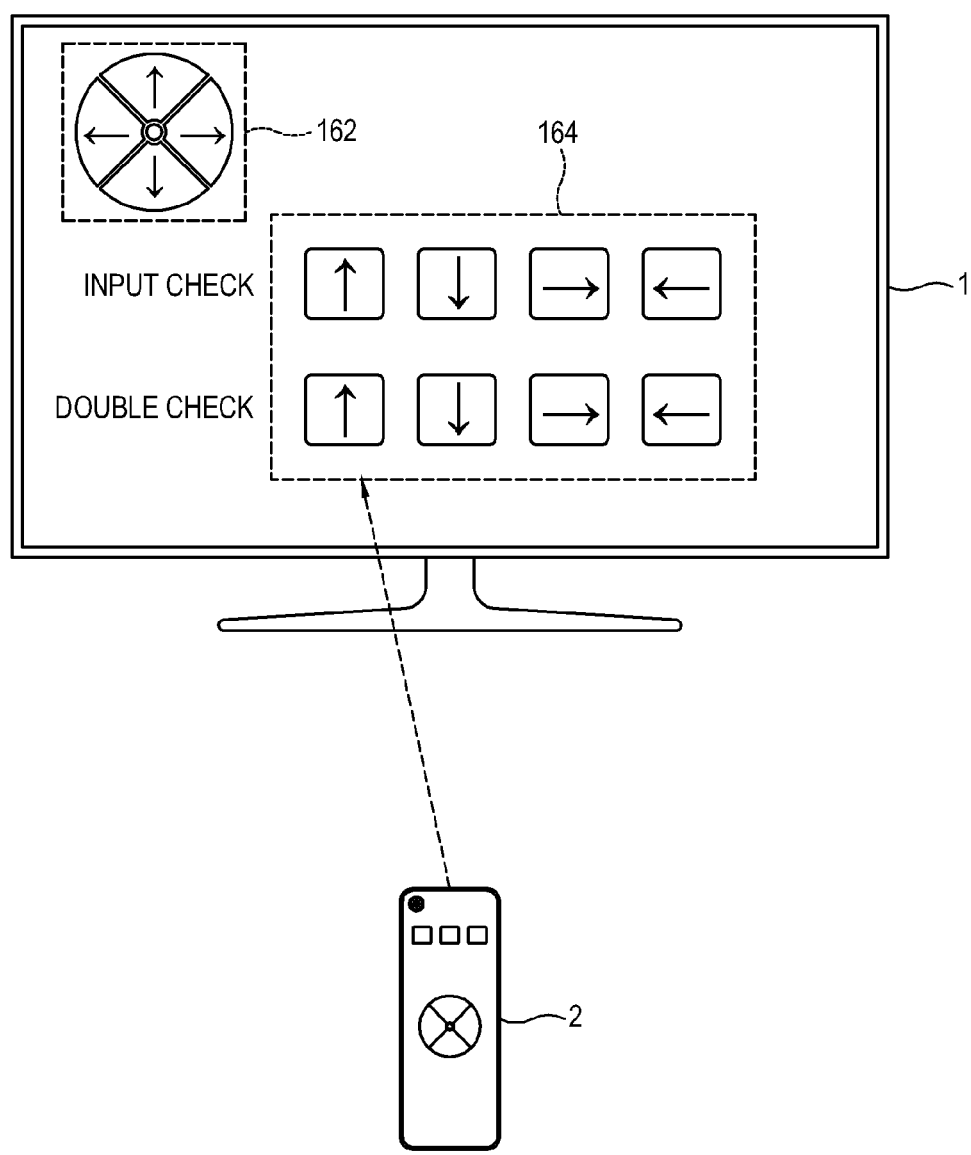
FIG. 4 is a view showing an example in which a remote controller is used to set up a password and have access to a display apparatus, according to an exemplary embodiment.

FIG. 4 is a view showing an example where a remote controller 2 is used to set up a password and permit access in a display apparatus 1, according to an exemplary embodiment.

FIG. 4 shows a screen for setting up a password for watching a subscription channel, as an example of using the arrow keys of the remote controller 2. As a UI for setting up the password in accordance with guidelines for watching the subscription channel, an arrow key UI 162 and a password checking UI 164 showing the password input check and double check, are displayed on the display 130.

In operation, a user inputs the arrow keys of an up key, a down key, a right key and a left key, as desired by him/her. In response to a user pressing the up key from among the arrow keys, a corresponding up key on the arrow key UI 162 may flicker so that a user can confirm the input of the arrow key. Also, the password checking UI 164 may display the input which corresponds to a user's input. Such password setup may be just an example. The arrow keys may be combined with numerals. When a user's rechecking input is finished, the password key is set up and stored.

Thereafter, in the case of watching a desired subscription channel, when the UI for inputting the password is displayed, the set password, i.e., the password containing the arrow keys may be input so as to have access.

Figure 5:
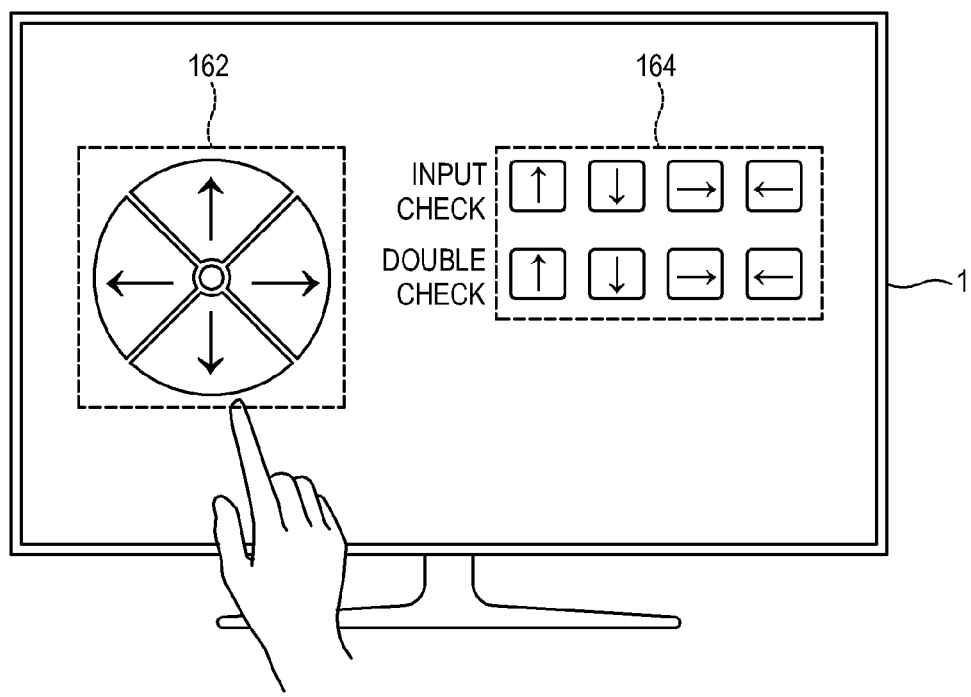
FIG. 5 is a view showing an example in which a touch panel is used to set up a password and have access to a display apparatus, according to an exemplary embodiment.

FIG. 5 is a view showing an example where a touch panel 132 is used to set up a password and have access to a display apparatus 1, according to an exemplary embodiment.

In FIG. 5, a user directly touches the touch panel 132 to set up a password and have access, like that of FIG. 4. In the case of having access, the password checking UI 164 may not perform rechecking.

In the foregoing display apparatus 1, the password key can be set up through the key signal including the arrow key signal, thereby maximally decreasing the exposure of personal information through an unusual password based on various combinations, and improving the security capabilities of the password set up with respect to ages of users or individually restricted functions.

As described above, when the password is set up, the password key is set up and stored through the key signal which includes the arrow key signal. When access is attempted, the access is allowed when the key signals including the arrow key signal are compared and they match each other. Thus, the effect is to maximally decrease the exposure of personal information through an unusual password based on various combinations, and improving security capabilities of the password set up with respect to ages of users or individually restricted functions.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
    an image processor configured to process a video signal;
    a display configured to display an image based on the processed video signal;
    a receiver configured to receive a first or second key signal input by a user;
    a storage configured to store a password key; and
    a controller configured to receive a user's first key signal which comprises an arrow key signal when a password is being set up for the display apparatus, set up and store the password key which corresponds to the received first key signal, receive a user's second key signal when access is attempted, and allows access in response to the received second key signal and the stored password key matching each other through a comparison, wherein the password key comprises at least one digit, and the arrow key signal corresponds to the at least one digit of the password key.

2. The display apparatus according to claim 1, wherein the receiver comprises a key operating portion configured to be operable in directions which respectively correspond to a plurality of arrow keys.

3. The display apparatus according to claim 1, wherein the receiver receives from a remote controller a remote control signal which corresponds to the user's second key signal.

4. The display apparatus according to claim 1, wherein the receiver comprises a touch panel provided in the display and is configured to receive a user's touch input.

5. The display apparatus according to claim 1, further comprising a user interface (UI) generator which generates a UI to be displayed,
wherein the display displays the UI showing directions which correspond to the received key signal.

6. The display apparatus according to claim 5, wherein the controller controls a password checking UI which shows an input check and a double check to be generated which corresponds to the key signal, in accordance with touch of the arrow key on the password checking UI by the user.

7. A method of controlling a display apparatus, comprising:
receiving a user's first key signal comprising an arrow key signal when a password is being set up for the display apparatus;
setting up and storing the password key which corresponds to the received first key signal;
receiving a user's second key signal when access is attempted;
comparing the received second key signal and the stored password key; and
allowing access in response to the received second key signal and the stored password key matching each other, wherein
the password key comprises at least one digit, and the arrow key signal corresponds to the at least one digit of the password key.

8. The method according to claim 7, wherein receiving the first key signal and receiving the second key signal comprise receiving from a remote controller a remote control signal which corresponds to a user's second key signal.

9. The method according to claim 7, wherein the receiving the first key signal and the receiving the second key signal comprise receiving a user's touch input.

10. The method according to claim 7, wherein receiving the first key signal and receiving the second key signal comprise displaying a user interface (UI) showing a direction which corresponds to the received second key signal.

11. The method according to claim 10, wherein the displaying the UI comprises generating a password checking UI showing an input check and a double check which corresponds to the key signal, in accordance with a touch of the arrow key on the UI.

12. A display apparatus comprising:
a receiver configured to receive a first or second key signal input by a user; and
a controller configured to receive a user's first key signal which comprises an arrow key signal when a password is being set up for the display apparatus, set up and store the password key which corresponds to the received first key signal, receive a user's second key signal when access is attempted, and allows access in response to the received second key signal and a stored password key which match each other through a comparison, wherein
the password key comprises at least one digit, and the arrow key signal corresponds to the at least one digit of the password key.

13. The display apparatus of claim 12, further comprising an image processor configured to process a video signal.

14. The display apparatus of claim 12, further comprising a display configured to display an image based on the processed video signal.

15. The display apparatus of claim 12, further comprising a storage configured to store the password key.

16. The display apparatus according to claim 12, wherein the controller controls a password checking UI which shows an input check and a double check to be generated which corresponds to the key signal, in accordance with touch of an arrow key on the password checking UI by the user.

17. The display apparatus according to claim 1, wherein the arrow key signal is the password.

18. The display apparatus according to claim 1, wherein the password includes a combination of the arrow key signal and numerals.

* * * * *